Jan. 16, 1962  S. VERNET  3,016,748
SQUEEZE-PUSH POWER ELEMENT
Filed July 25, 1957
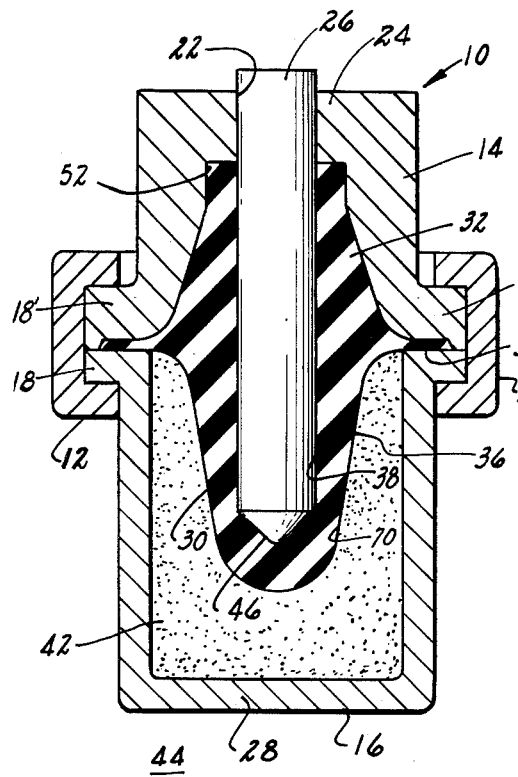
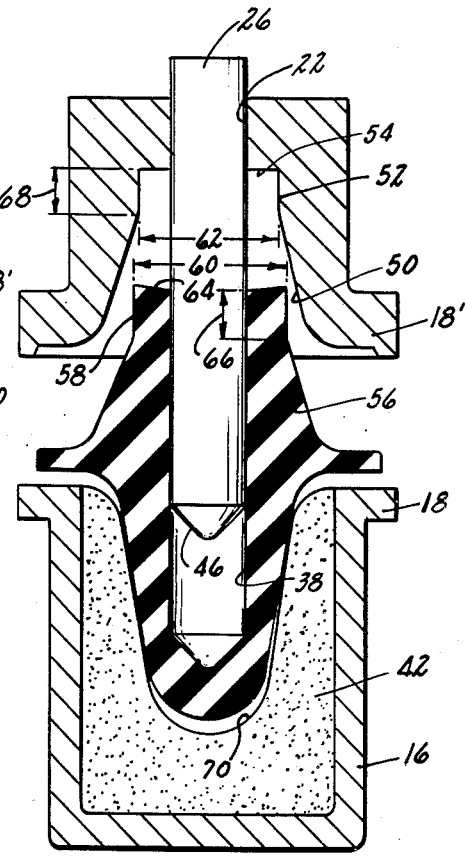
INVENTOR.
SERGIUS VERNET
BY
SMITH, OLSEN, LEWIS & McRAE
ATTORNEYS 3,016,748
SQUEEZE-PUSH POWER ELEMENT
Sergius Vernet, Yellow Springs, Ohio
Filed July 25, 1957, Ser. No. 674,208
7 Claims. (Cl. 73—368.3)

This invention relates to power elements of the type which are operated by pressure changes of a contained pressure-producing material. The pressure-producing material may be a thermally expansible material or a hydraulic material. Power elements of this type are useful for operating such devices as switches and valves.

Objects of the invention are, singly and collectively, to provide a power element wherein:

(1) the element has a comparatively long movement distance in relation to its axial dimension, (2) the "long movement distance" feature is attained without parts jamming or improper guiding of the moving component, (3) the power element component parts are capable of manufacture as low cost items, (4) the efficiency (in terms of motion produced per pressure input) is relatively high, (5) the power element has an improved seal construction for preventing flow of ambient media into the element, (6) power element overtravel is controlled in such manner as to prevent parts breakage, (7) tendency of the power element sealing and force-transmitting structures to rupture or otherwise fail in service is decreased.

Other objects of this invention will appear in the following description and appended claims, reference being had to the accompanying drawings forming a part of this specification wherein like reference characters designate corresponding parts in the several views.

In the drawings:

FIG. 1 is a sectional view through one embodiment of the invention.

FIG. 2 is a sectional view of the FIG. 1 embodiment, but showing the components in the positions they occupy prior to their assembly together.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a power element 10 comprising a metal container 12 formed by two facing cup members 14 and 16. Each of the cup members is provided with a peripheral flange 18 or 18' at its mouth, and a retainer ring 20 is clamped over these flanges to retain the cup member in fixed positions relative to one another.

Cup member 14 is provided with an opening 22 in its end wall 24, and a piston 26 is extended through the opening to a point adjacent end wall 28 of cup member 16. Surrounding piston 26 is a body of force-transmitting material 30 formed of vulcanized rubber or other similar elastomeric material. Body 30 includes an annular plug portion 32 fitting within cup member 14. An annular flange or rim portion 34 extends from plug portion 32 into a clamped position between flanges 18, 18'.

Force-transmitting body 30 includes a sleeve portion 36 extending from the lower limit of plug portion 32. The plug and sleeve portions combine to define a bore 38. Initially bore 38 is made about .002 inch undersize with respect to the piston diameter. As a result, when piston 26 is assembled into bore 38 the sleeve and plug portions tightly fit against the piston.

Member 14 is provided with an internal frusto conical surface 50 and a cylindrical surface 52. An annular radially extending surface 54 is provided between opening 22 and cylindrical surface 52.

Plug portion 32 of force-transmitting body 30 is contoured to provide a frusto conical section 56 and a cylindrical section 58. It will be noted however that in the FIG. 2 "free state" position of body 30 cylindrical section 58 has a diameter 60 which is greater than the diameter 62 of the circle described by cylindrical surface 52. Preferably the diameter of section 58 is so related to diameter 62 that the annular volume defined between piston 26 and surface 52 is about twenty five percent less than the volume of cylindrical section 58. It is contemplated that volumetric differences approaching fifty percent could under certain circumstances be employed.

As can be seen from FIG. 2 the upper end surface 64 of section 58 is conically concaved, i.e. surface 64 forms a small conical depression in section 58. The angle of the conical depression with respect to a horizontal plane is preferably about six degrees.

Assembly of the FIG. 2 component parts to form the FIG. 1 power element may be effected by inserting piston 26 partly into bore 38 (as shown in FIG. 2) and thereafter forcing section 58 into its FIG. 1 position in engagement with surface 52. During this "forcing" operation the outer surface of section 58 is cammed along surface 50 so as to enable section 58 to become engaged with surface 52. In its FIG. 1 position illustrated section 58 is reduced in volume by about twenty-five percent as compared with its volume when in the FIG. 2 "free state" position; consequently section 58 is put under considerable radial compression so as to tightly seal against surface 52 and piston 26.

The axial dimension 66 of section 58 (adjacent bore 38) is preferably slightly greater than the corresponding dimension 68 of surface 52. Consequently, when section 58 is forced into its FIG. 1 position surface 64 is ensured of seating tightly against surface 54.

Sleeve section 36 of body 30 extends into a solid thermally-expansible, pressure-producing material 42 contained in cup member 16. Material 42 may be any of several materials, as for example paraffin or the thermal materials disclosed in U.S. Patent No. 2,259,846. The exact nature of material 42 is determined in accordance with the desired operating characteristics of the power element. The expansible material is formed as a solid pellet having a cavity 70 conforming to the contour of sleeve section 36.

In operation of the power element, piston 26 takes the FIG. 1 position when material 42 is in a solid condition at a temperature below its expansion temperature range. When the temperature of ambient medium 44 rises sufficiently material 42 heats up so as to expand and exert a radial "squeezing" pressure against sleeve 36. This radial squeezing pressure is transmitted through sleeve 36 to the conical surface 46 of piston 26 so as to force the piston upwardly in bore 38. This "squeezing" action on sleeve 36 is effective to move the piston until the lower end of the piston reaches a point within plug portion 32 about on a line with rim portion 34. Thereafter, continued heating of material 42 causes the expansion pressure of material 42 to be exerted vertically upward on plug portion 32. At least a portion of this upward pressure is directed upwardly against surface 46 so as to push the piston upwardly.

In this connection, as the piston moves up in bore 38 it leaves a free space into which part of the plug portion can shift. As a result there is an actual bodily displacement of the plug in an upward direction.

It will be noted that surfaces 50 of cup member 14 converges toward the piston axis as it leads away from cup member 16. This convergence causes part of the upward pressure on plug portion 32 to be redirected radially against conical surface 46 so as to aid in moving the piston toward its extreme uppermost position.

When the temperature of medium 44 decreases material 42 is cooled so as to decrease its volumetric displacement. As a result the upward pressure on the piston is decreased sufficiently to allow a spring (not shown) to return the piston toward its FIG. 1 position. The spring may act directly on the piston or it may act indirectly thereon in the manner of spring 24 in U.S. Patent No. 2,636,776.

The piston has a very limited engagement with end wall 24 during its reciprocating movement. However the "rigid positioning" of plug portion 32 between the piston and cup member surfaces 50, 52 prevents any "canting" or improper guiding of the piston. In this connection, plug portion 32 serves the double function of force-transmitter and piston guide. Because of the disposition of plug portion 32 around the piston the piston can be made to have a relatively long stroke in relation to the length of the power element without danger of piston jamming. End wall 24 need not be machined to provide an extensive guide surface for the piston, and cup member 14 can be formed as a low cost item by the use of low cost stamping, drawing, molding or impact extrusion manufacturing operations.

During upward movement of piston 26 the tight fit of body 30 thereon is such that the elastomeric body has a tendency to move with the piston. This action tends to increase the pressure of surface 64 on that portion of surface 54 which is immediately adjacent opening 22. The outer portion of surface 64 tends to lag behind the inner portion, but due to the "conical" character of surface 64 there is always maintained a tight seal at the outer portion of surface 64. This constant seal avoids any trapping of outside media along surfaces 52 and 50.

The illustrated power element, though employing a minimum number of parts, performs efficiently with good sealing characteristics, even after prolonged service.

I claim:

1. A power element comprising a container having an opening in one wall; a piston extending through said opening; an elastomeric force-transmitting body within said container and surrounding said piston; and pressure-producing material within said container; said force-transmitting body including an annular plug portion surrounding the piston adjacent the container opening and extending along the piston for a substantial axial distance; said force-transmitting body also including a sleeve portion extending inwardly from the plug portion a substantial axial distance and surrounding the innermost end portion of the piston; whereby initial outward movement of the piston is effected by a radial squeezing of the sleeve portion, and final outward movement of the piston is effected by an axial push of the plug portion; the container having a frusto conical surface of substantial axial dimension engaged with the innermost section of the plug portion and a cylindrical surface engaged with the outermost section of the plug portion; the aforementioned opening in the container being of lesser diameter than the diameter of the circle described by the aforementioned cylindrical surface so as to form an annular radially extending surface therebetween; the outer end of the plug portion which engages the radially extending surface being conically concaved in the free state but being deformed into engagement with the radially extending surface during assembly of the power element.

2. A power element comprising a container having an opening in one wall; a piston extending through said opening; an elastomeric force-transmitting body within said container and surrounding said piston; and pressure-producing material within said container; said force-transmitting body including an annular plug portion surrounding the piston adjacent the container opening and extending along the piston for a substantial axial distance; said force-transmitting body also including a sleeve portion extending inwardly from the plug portion a substantial axial distance and surrounding the innermost end portion of the piston; whereby initial outward movement of the piston is effected by a radial squeezing of the sleeve portion, and final outward movement of the piston is effected by an axial push of the plug portion; the container having a frusto conical surface of substantial axial dimension engaged with the innermost section of the plug portion and a cylindrical surface engaged with the outermost section of the plug portion; the aforementioned opening in the container being of lesser diameter than the diameter of the circle described by the aforementioned cylindrical surface so as to form an annular radially extending surface therebetween; the outer end of the plug portion being pressuringly engaged with the radially extending surface, with the end of the plug section being initially formed with a generally conically concaved configuration but being deformed by the radially extending surface whereby to be insured of having substantial pressure on the radially extending surface at points adjacent the aforementioned cylindrical surface.

3. A power element comprising first and second cup members facing each other and fixedly secured together, said first cup member having an opening in its end wall; a piston extending through said opening and into the interior of the second cup member to a point adjacent the second cup member end wall; an elastomeric force-transmitting body within said cup members; said force-transmitting body including an annular plug portion surrounding the portion of the piston within the first cup member, and a sleeve portion extending from the plug portion to surround the portion of the piston within the second cup member; and pressure-producing material within the second cup member surrounding the sleeve portion; said first cup member having an internal frustro conical surface of substantial axial dimension tapering from its mouth, and an internal cylindrical surface extending from the outer limit of the frusto conical surface; said plug portion including a cylindrical section engaging the cylindrical surface but deformed thereby from a diameter greater than that of the circle described by said cylindrical surface; said first cup member having an internal radially extending annular surface between the opening and cylindrical surface; the outer end of the cylindrical plug section being initially formed with a generally conically concaved configuration but being pressuringly engaged with said annular surface to be deformed into tight sealing engagement with the annular surface at points adjacent the cylindrical surface.

4. A power element comprising a container having an opening in one wall; a piston extending through said opening; a force-transmitting body surrounding said piston comprising a plug portion seating against the container inner surface and a sleeve portion extending from said plug portion in spaced relation to the container inner surface; and pressure producing material within said container surrounding the sleeve portion; said plug portion comprising a tapering section of substantial axial extent having its larger end connected with the sleeve portion, and a sealing annulus from the smaller end of the tapering section; whereby initial outward movement of the piston is effected by radial squeezing of the sleeve portion, and final outward movement of the piston is effected by an axial push of the plug portion; the opening in the container wall being of less diameter than the diameter of the annulus to define an annular wall surface pressuringly engaging the end of said annulus; the end of said annulus being initially formed with a recess in its central area to insure that the outermost surface area of said annulus end will have pressure sealing engagement with the annular wall surface.

5. A power element comprising a container; a piston extending into said container and having a tip located therewithin; force-transmitting material within said container and surrounding the piston; and pressure-producing material within said container; said force-transmitting material including an annular plug portion packed within a section of the container and surrounding a portion of the piston remote from its tip; said force-transmitting material also including a sleeve portion extending from the plug portion a substantial distance and surrounding the tip of the piston; said pressure-producing material including an annular ring of material surrounding the sleeve portion for its entire length; and said sleeve portion and plug portion being so dimensioned that the plug portion has an end surface thereof in pressure contact with the annular ring of pressure-producing material, whereby initial outward movement of the piston is effected by a radial squeezing of the sleeve portion, and final outward movement of the piston is effected by an axial push of the pressure-producing material on the annular end surface of the plug portion; said plug portion comprising a tapering section of substantial axial extent having its larger end connected with the sleeve portion, and a sealing annulus extending from the smaller end of the tapering section; said sealing annulus having an annuluar recess in the end surface thereof adjacent the piston, whereby during outward movement of the piston the tendency of the piston to carry the force-transmitting material therewith will result in a sealing pressure between the recess-forming surface and the container.

6. A power element comprising a cup element having an annular edge portion defining a cup mouth; pressure producing material within said cup element; an elastomeric force-transmitting body having an annular rim portion seated on the aforementioned edge portion; a cover element having an annular edge section clampingly engaging the elastomeric rim portion; said cover element providing an internal frusto-conical surface of substantial axial dimension extending from the annular edge section and an internal cylindrical surface extending from the smaller end of the frusto-conical surface; a piston co-axial with the cover element and projecting therethrough into the force-transmitting body and beyond the cup mouth, the piston and the cylindrical surface defining therebetween an annular space; said force-transmitting body including a frusto-conical plug portion engaging the frusto-conical surface and a cylindrical end portion engaging said cylindrical surface; said force-transmitting body also including a sleeve portion extending into the cup and surrounding an end portion of the piston; the cylindrical end portion of the plug portion interposed between the cylindrical surface of the cover element and the piston being oversized relative to the annular space so as to be radially compressed by its contact with the piston and the cover element during assembly of the power element to form a pressure seal between the piston surface and said cylindrical cover surface, the oversizing of the plug portion being sufficient to insure maintenance of peripheral contact with the piston and the cover element despite thermal contraction of the plug portion in use.

7. A power element comprising a cup having an annular edge portion defining a cup mouth; pressure producing material within said cup; an elastomeric force-transmitting body having an annular peripheral flange seated on the aforementioned edge portion; a cover having an annular edge section clampingly engaging the elastomeric body flange; said cover providing an internal frusto-conical surface of substantial axial dimension extending from the annular edge section and an internal cylindrical surface extending from the smaller end of the frusto-conical surface; a piston extending axially through the cover element into the force-transmitting body and beyond the cup mouth; said force-transmitting body including a frusto-conical plug engaging the frusto-conical surface and a cylindrical end engaging said cylindrical surface; said force-transmitting body also including a sleeve extending into the cup and surrounding an end of the piston; the cylindrical end of the plug engaged with the cylindrical surface of the cover element being of an initial exterior diameter substantially greater than the internal diameter of the element surface, and sufficient to maintain sealing contact therebetween despite thermal contraction of the plug, and the plug end being of an axial extent sufficient to accommodate thermal contraction thereof without withdrawal of the plug end from the cylindrical surface of the cover, the end portion of the plug portion thus being radially compressed by its contact with the piston and the cover element during assembly of the power element to form a pressure seal between the piston surface and the cylindrical cover surface.

References Cited in the file of this patent

UNITED STATES PATENTS

| | | |
|---|---|---|
| 2,208,149 | Vernet | July 16, 1940 |
| 2,368,181 | Vernet | Jan. 30, 1945 |
| 2,507,466 | De Craene | May 9, 1950 |
| 2,806,376 | Wood | Sept. 17, 1957 |

FOREIGN PATENTS

| | | |
|---|---|---|
| 531,280 | Great Britain | Jan. 1, 1941 |